United States Patent
Gao et al.

(10) Patent No.: US 12,155,823 B2
(45) Date of Patent: Nov. 26, 2024

(54) SYSTEMS AND METHODS FOR WARP EXTEND AND WARP DELTA SIGNALING

(71) Applicant: TENCENT AMERICA LLC, Palo Alto, CA (US)

(72) Inventors: Han Gao, Palo Alto, CA (US); Xin Zhao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 125 days.

(21) Appl. No.: 18/127,378

(22) Filed: Mar. 28, 2023

(65) Prior Publication Data

US 2024/0171734 A1    May 23, 2024

Related U.S. Application Data

(60) Provisional application No. 63/427,061, filed on Nov. 21, 2022.

(51) Int. Cl.
*H04N 19/109* (2014.01)
*H04N 19/137* (2014.01)
(Continued)

(52) U.S. Cl.
CPC ......... *H04N 19/109* (2014.11); *H04N 19/137* (2014.11); *H04N 19/174* (2014.11);
(Continued)

(58) Field of Classification Search
CPC .. H04N 19/109; H04N 19/137; H04N 19/174; H04N 19/176; H04N 19/52; H04N 19/70
See application file for complete search history.

(56) References Cited

U.S. PATENT DOCUMENTS

| | | | |
|---|---|---|---|
| 10,560,712 B2* | 2/2020 | Zou | H04N 19/537 |
| 2010/0215101 A1* | 8/2010 | Jeon | H04N 19/583 |
| | | | 375/E7.243 |

(Continued)

OTHER PUBLICATIONS

Sarah Parker et al., "Global and Locally Adaptive Warped Motion Compensation in Video Compression", 2017 IEEE International Conference on Image Processing (ICIP), 2017, 5 pgs., Retrieved from the Internet: https://ieeexplore.ieee.org/abstract/document/8296286.

(Continued)

*Primary Examiner* — James T Boylan
(74) *Attorney, Agent, or Firm* — Morgan, Lewis & Bockius LLP

(57) ABSTRACT

The various embodiments described herein include methods and systems for coding video. In one aspect, a method includes obtaining encoded video data comprising a plurality of blocks and parsing the encoded video data for each block in the plurality of blocks without reconstructing an entire motion vector predictor (MVP) list. The method also includes first determining whether warped motion compensation is allowed for the block and whether warped motion compensation is enabled for a first spatial neighbor block; and determining whether to perform warped motion compensation for the block during a subsequent reconstruction operation based on the first determination. The method further includes designating the block for a warp extend operation or a warp delta operation in accordance with a determination to perform warped motion compensation for the block during the subsequent reconstruction operation.

20 Claims, 8 Drawing Sheets

(51) Int. Cl.
*H04N 19/174* (2014.01)
*H04N 19/176* (2014.01)
*H04N 19/52* (2014.01)
*H04N 19/70* (2014.01)

(52) U.S. Cl.
CPC ........... *H04N 19/176* (2014.11); *H04N 19/52* (2014.11); *H04N 19/70* (2014.11)

(56) References Cited

U.S. PATENT DOCUMENTS

| | | | |
|---|---|---|---|
| 2018/0270497 A1* | 9/2018 | Mukherjee | H04N 19/543 |
| 2019/0110063 A1* | 4/2019 | Mukherjee | H04N 19/517 |
| 2019/0130526 A1* | 5/2019 | Zhou | H04N 5/2628 |
| 2020/0154126 A1* | 5/2020 | Li | H04N 19/513 |

OTHER PUBLICATIONS

Tencent Technology, ISRWO, PCT/US2023/016740, Jul. 19, 2023, 16 pgs.

* cited by examiner

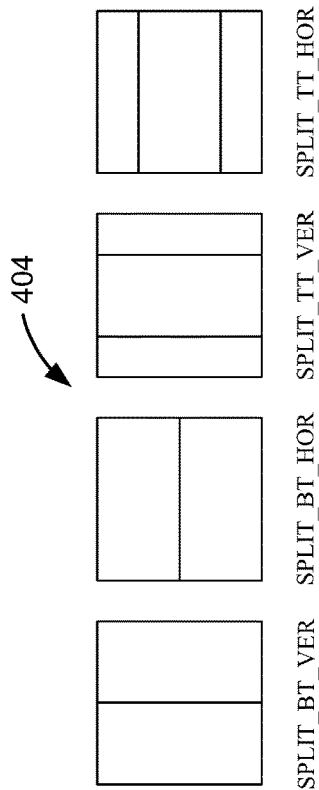
FIG. 4A
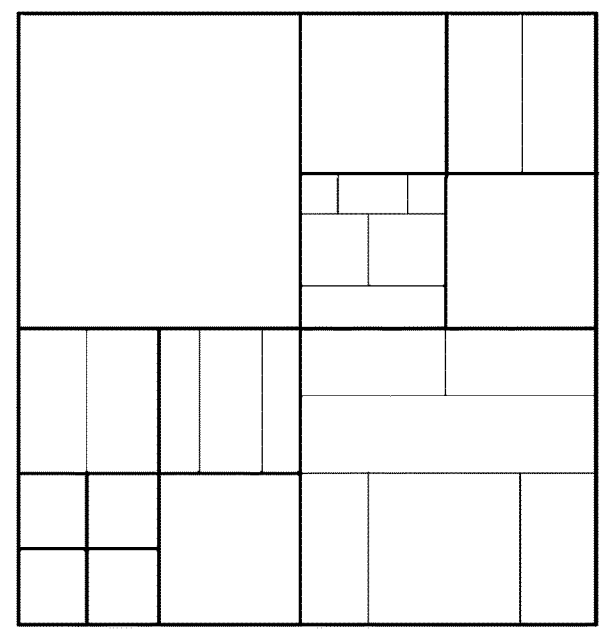
FIG. 4C
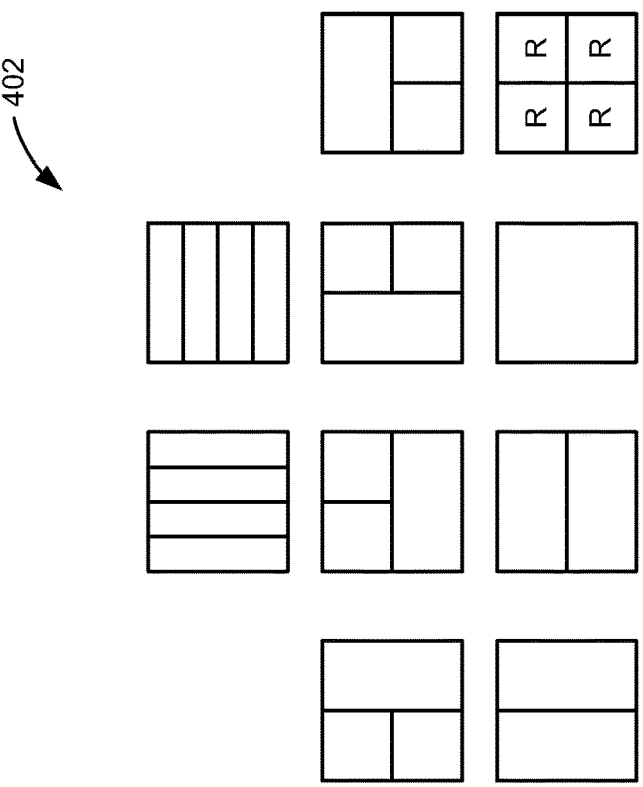
FIG. 4B
FIG. 4D

SYSTEMS AND METHODS FOR WARP EXTEND AND WARP DELTA SIGNALING

RELATED APPLICATIONS

This application claims priority to U.S. Provisional Patent Application No. 63/427,061, entitled "Improvements on Warp Extend and Warp Delta Signaling" filed Nov. 21, 2022, which is hereby incorporated by reference in its entirety.

TECHNICAL FIELD

The disclosed embodiments relate generally to video coding, including but not limited to systems and methods for warp extend and warp delta signaling.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, a video stream can be encoded into a bitstream that involves compression and then transmission to a decoder that can decode/decompress the video stream in preparation for viewing or further processing. Compression of video streams can exploit the spatial and temporal correlation of video signals by spatial and/or motion compensated prediction. Motion compensated prediction can include inter prediction. Inter prediction can use one or more motion vectors to generate a block to be encoded using previously encoded and decoded pixels. A decoder receiving the encoded signal can recreate the block.

Not all motion across an image is translational. Thus, a translational motion pattern is not able to accurately describe more complex motions, such as rotation, zoom, and shear. To overcome this drawback, a warped motion mode can be used that uses an affine model. However, it is important to determine when (e.g., on which blocks) warped motion is allowed.

In accordance with some embodiments, a method of decoding video is provided. The method includes: (i) obtaining encoded video data comprising a plurality of blocks; (ii) parsing the encoded video data for each block in the plurality of blocks without reconstructing an entire motion vector predictor (MVP) list; (iii) first determining whether warped motion compensation is allowed for the block and whether warped motion compensation is enabled for a first spatial neighbor block; (iv) determining whether to perform warped motion compensation for the block during a subsequent reconstruction operation based on the first determination; and (v) designating the block for a warp extend operation or a warp delta operation in accordance with a determination to perform warped motion compensation for the block during the subsequent reconstruction operation.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIGS. 4A-4D illustrate example coding tree structures in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes, among other things, when (e.g., on which blocks) to allow warped motion modes. Allowance of a warp extend mode (or warp delta mode) and the context derivation of the warp extend mode may require the MVP index-pointed MVP candidate. However, requiring the MVP index-pointed MVP candidate during the parsing process, requires the whole MVP list (DRL list) to be constructed. Constructing the MVP list can significantly delay the parsing process. The methods and systems described herein include determining when to allow warp extend mode and/or warp delta mode without requiring the MVP list be constructed. For example, the determination may be based on motion mode(s) of neighboring block(s).

Example Systems and Devices

Figure 1:
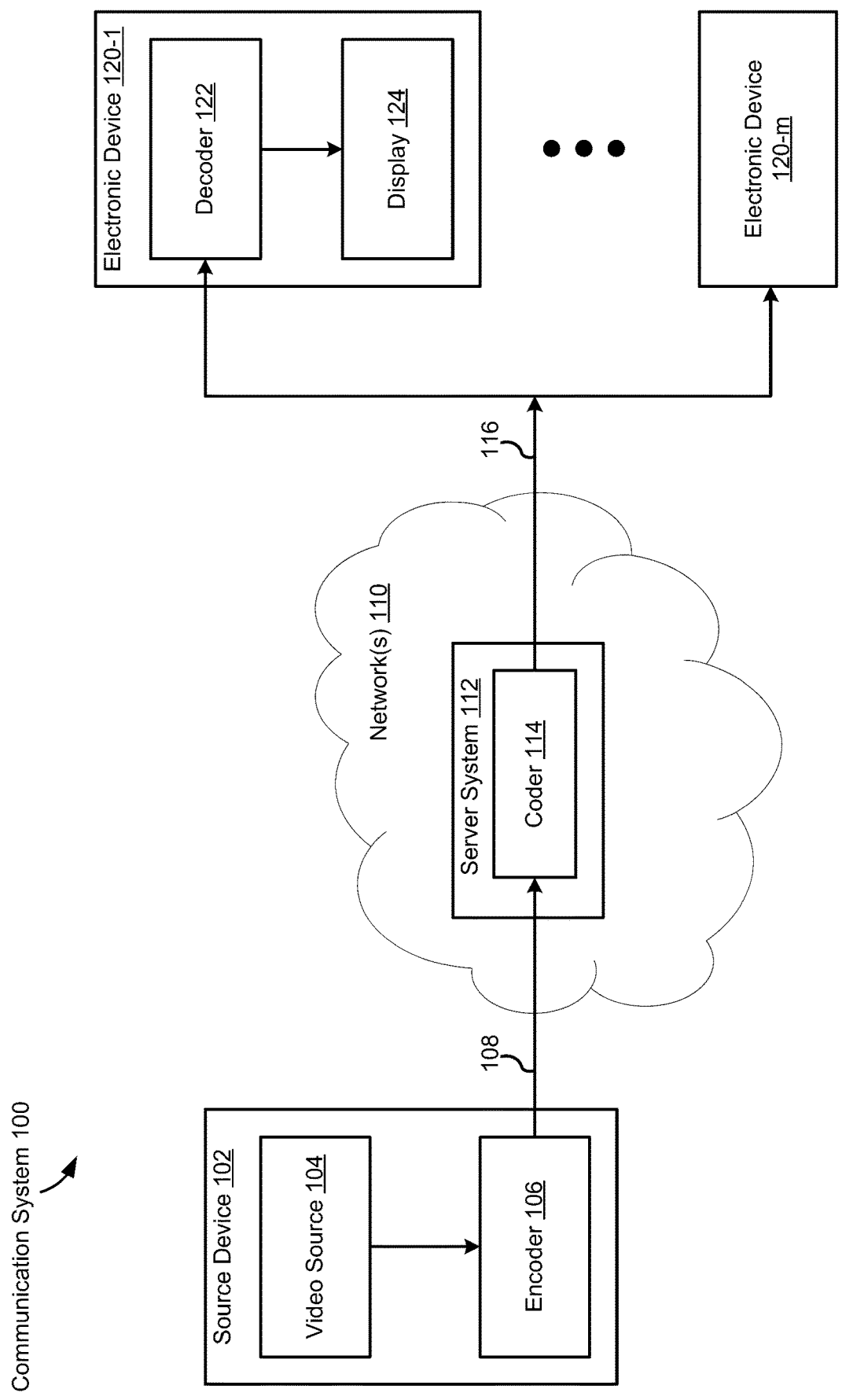
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
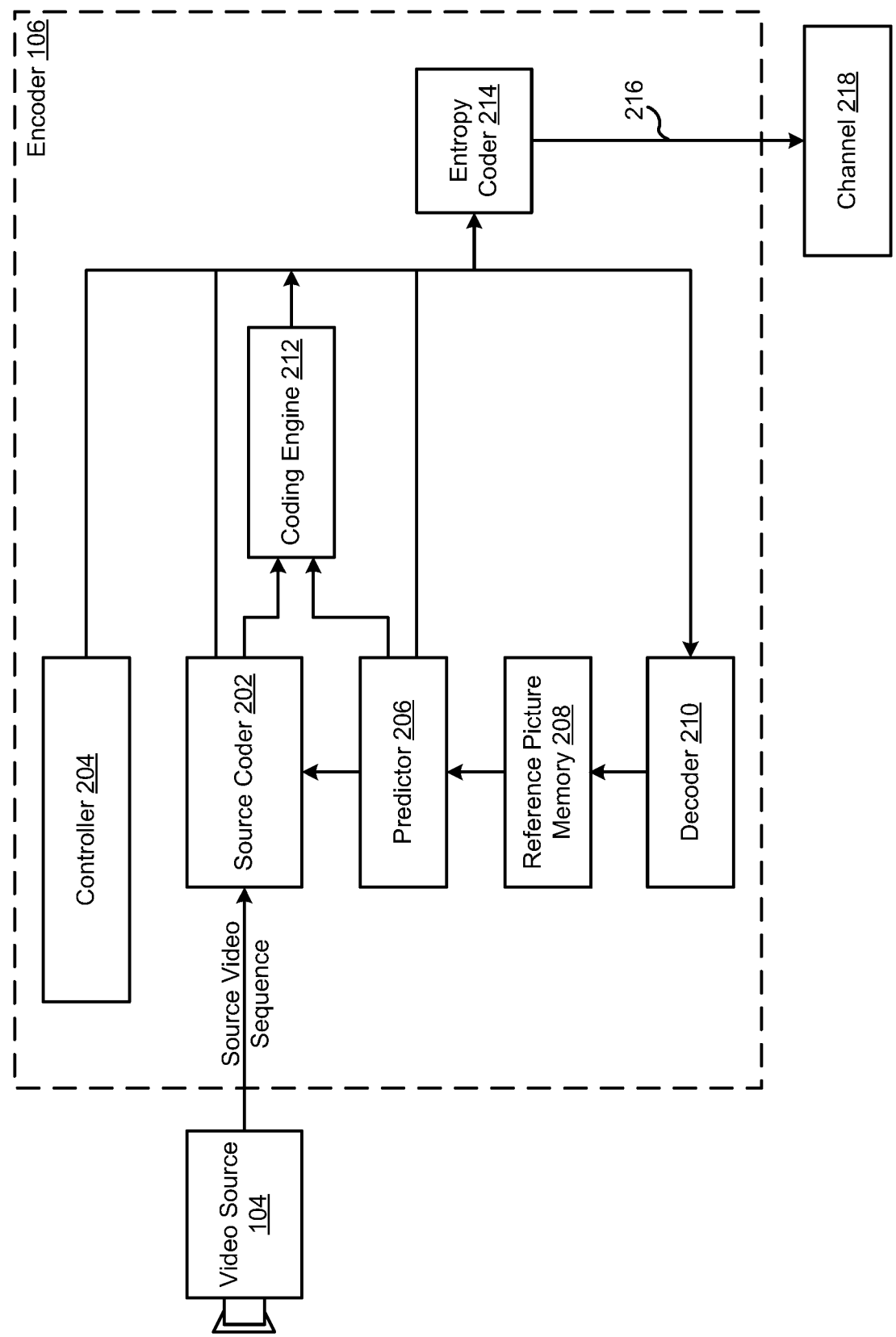
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
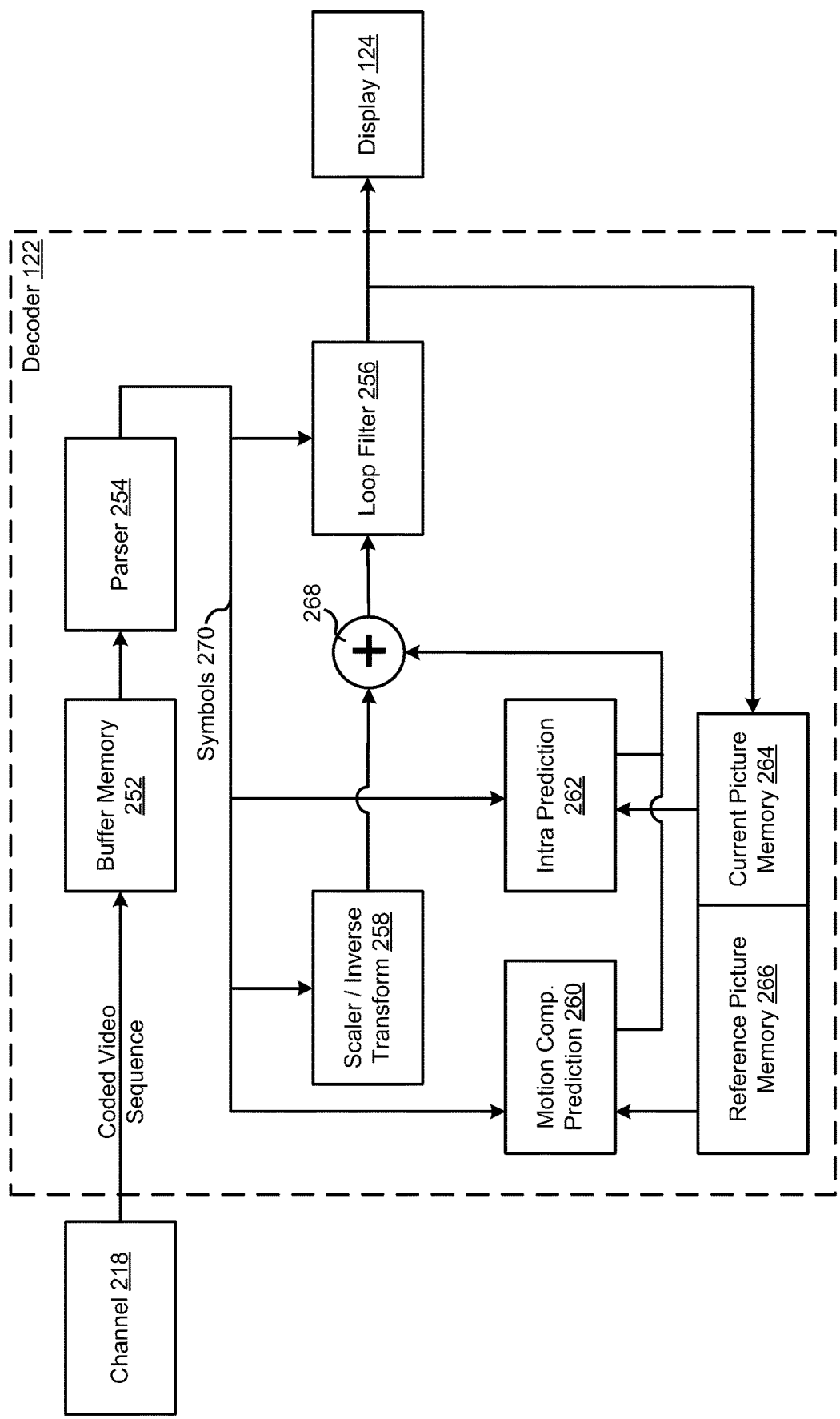
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
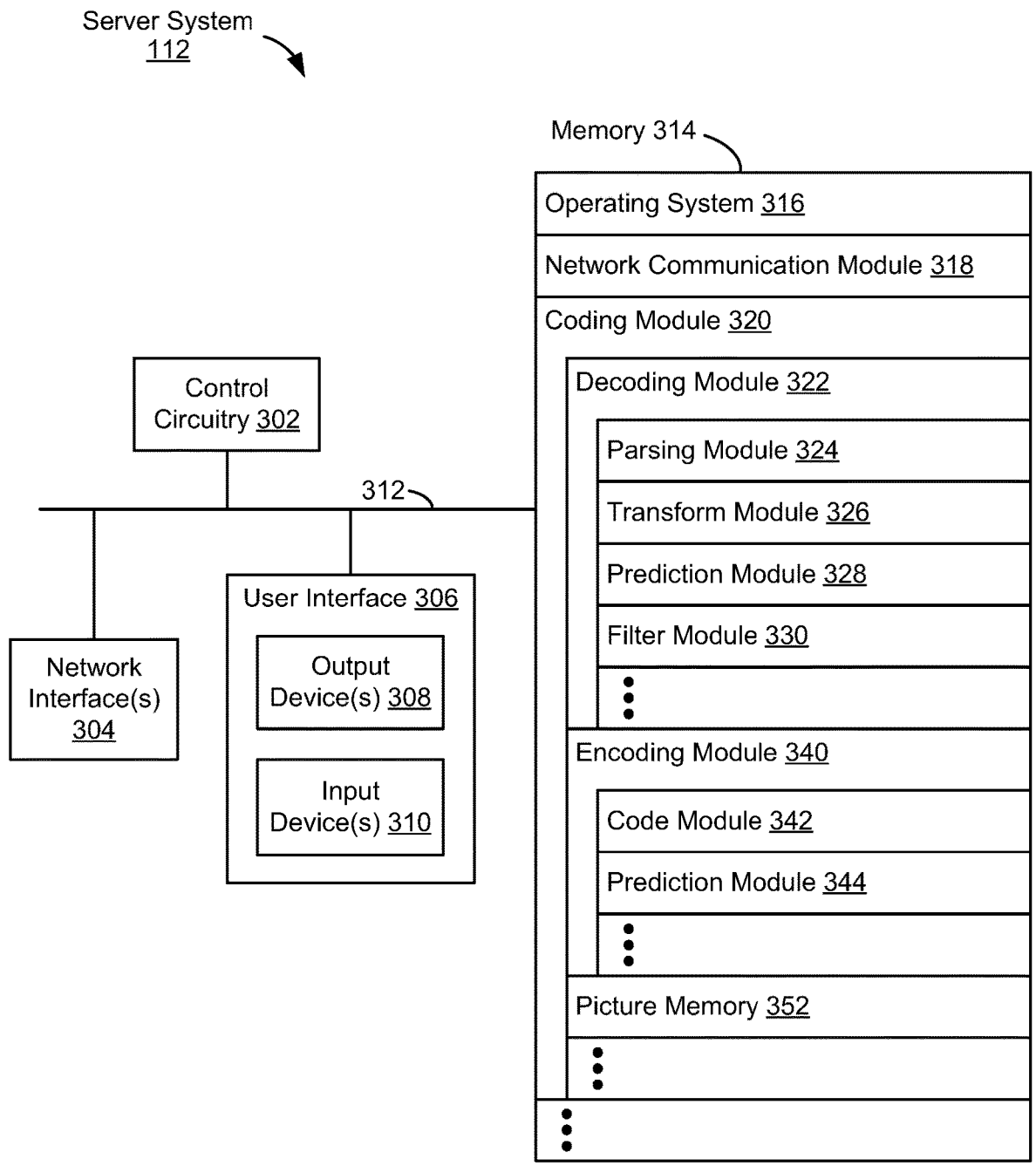
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;
 a network communication module 318 that is used for connecting the server system 112 to other computing devices via the one or more network interfaces 304 (e.g., via wired and/or wireless connections);
 a coding module 320 for performing various functions with respect to encoding and/or decoding data, such as video data. In some embodiments, the coding module 320 is an instance of the coder component 114. The coding module 320 including, but not limited to, one or more of:
  a decoding module 322 for performing various functions with respect to decoding encoded data, such as those described previously with respect to the decoder component 122; and
  an encoding module 340 for performing various functions with respect to encoding data, such as those described previously with respect to the encoder component 106; and
 a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B is referred to as a T-type partition. The rectangular partitions in this tree structure cannot be further subdivided. In addition to a coding block size, coding tree depth can be defined to indicate the splitting depth from the root note. For example, the coding tree depth for the root node, e.g., 128×128, is set to 0, and after a tree block is further split once, the coding tree depth is increased by 1.

As an example, instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 are supported. For chroma blocks, only the largest possible transform units are allowed.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU. One of the key features of the HEVC structure is that it has multiple partition concepts including CU, PU, and TU. In HEVC, a CU or a TU can only be a square shape, while a PU may be a square or rectangular shape for an inter predicted block. In HEVC, one coding block may be further split into four square sub-blocks, and a transform is performed on each sub-block (TU). Each TU can be further split recursively (using quad-tree split) into smaller TUs, which is called Residual Quad-Tree (RQT). At a picture boundary, such as in HEVC, implicit quad-tree split may be employed so that a block will keep quad-tree splitting until the size fits the picture boundary.

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. For example, the multi-type tree structure includes vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An exception occurs when a maximum supported transform length is smaller than the width or height of the color component of the CU. An example of block partitions for one CTU (406) is shown in FIG. 4D, which illustrates an example quadtree with nested multi-type tree coding block structure.

A maximum supported luma transform size may be 64×64 and the maximum supported chroma transform size may be 32×32, such as in VVC. When the width or height of the CB is larger than the maximum transform width or height, the CB is automatically split in the horizontal and/or vertical direction to meet the transform size restriction in that direction.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

In order to support the extended coding block partitions, multiple transform sizes (e.g., ranging from 4-point to 64-point for each dimension) and transform shapes (e.g., square or rectangular with width/height ratio's 2:1/1:2 and 4:1/1:4) may be utilized, such as in AV1.

In some embodiments, for each coded block in an inter frame, if the mode of the current block is not skip mode but inter-coded mode, then another flag is signaled to indicate whether single reference mode or compound reference mode is used for the current block. A prediction block may be generated by one motion vector in single reference mode. In compound reference mode, the prediction block is generated by a weighted averaging of two prediction blocks derived from two motion vectors. Modes that may be signaled for a single reference case are detailed in Table 1 below.

TABLE 1

Single Reference Modes

| Modes | Description |
| --- | --- |
| NEARMV | use one of the MVPs in the list indicated by a Dynamic Reference List (DRL) index. |
| NEWMV | use one of the MVPs in the list signaled by a DRL index as reference and apply a delta to the MVP. |
| GLOBALMV | use a motion vector based on frame-level global motion parameters. |

Modes that may be signaled for a compound reference case are detailed in Table 2 below.

TABLE 2

Compound Reference Modes

| Modes | Description |
| --- | --- |
| NEAR_NEARMV | use one of the MVPs in the list signaled by a DRL index. |
| NEAR_NEWMV | use one of the MVPs in the list signaled by a DRL index as reference and send a delta MV for the second MV. |
| NEW_NEARMV | use one of the MVPs in the list signaled by a DRL index as reference and send a delta MV for the first MV. |
| NEW_NEWMV | use one of the MVPs in the list signaled by a DRL index as reference and send a delta MV for both MVs |
| GLOBAL_GLOBALMV | use MVs from each reference based on their frame-level global motion parameters. |

Some standards, such as AV1, allow for ⅛-pixel motion vector precision (or accuracy). Syntaxes may be used to signal the motion vector difference in reference frame list zero (L0) or list one (L1) as follows. For example, syntax mv_joint specifies which components of the motion vector difference are non-zero. Syntax mv_joint value of 0 indicates there is no non-zero MVD along either horizontal or vertical direction, value of 1 indicates there is non-zero MVD only along horizontal direction, value of 2 indicates there is non-zero MVD only along vertical direction, and value of 3 indicates there is non-zero MVD along both horizontal and vertical direction. Syntax mv_sign specifies whether a motion vector difference is positive or negative. Syntax my class specifies the class of the motion vector difference. As shown in Table 3 below, a higher class means that the motion vector difference has a larger magnitude. Syntax mv_bit specifies the integer part of the offset between the motion vector difference and a starting magnitude of each MV class. Syntax mv_fr specifies the first two fractional bits of the motion vector difference. Syntax mv_hp specifies the third fractional bit of the motion vector difference.

TABLE 3

Motion Vector Class and Magnitude

| MV class | Magnitude of MVD |
| --- | --- |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

For NEW_NEARMV and NEAR_NEWMV modes (shown in Table 2 above), the precision of the MVD depends on the associated class and the magnitude of MVD. For example, fractional MVD is allowed only if MVD magnitude is equal to or less than one-pixel. Additionally, only one MVD value is allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). The allowed MVD values in each MV class are shown in Table 6 below.

TABLE 4

Allowed MVD Per MV Class

| MV class | Magnitude of MVD |
| --- | --- |
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In some embodiments, if the current block is coded using NEW_NEARMV or NEAR_NEWMV mode, one context is used for signaling mv_joint or mv_class. If the current block is not coded using NEW_NEARMV or NEAR_NEWMV mode, another context is used for signaling mv_joint or mv_class.

An inter coded mode, JOINT_NEWMV, may be applied to indicate whether the MVDs for two reference lists are jointly signaled. If the inter prediction mode is equal to JOINT_NEWMV mode, the MVDs for reference L0 and reference L1 are jointly signaled. As such, only one MVD, named as joint_mvd, may be signaled and transmitted to a decoder, and delta MVs for reference L0 and reference L1 may be derived from joint_mvd. JOINT_NEWMV mode is signaled together with NEAR_NEARMV, NEAR_NEWMV, NEW_NEARMV, NEW_NEWMV, and GLOBAL_GLOBALMV mode.

When JOINT_NEWMV mode is signaled, and the picture order count (POC) distance between two reference frames and a current frame are different, MVD is scaled for reference L0 or reference L1 based on the POC distance. For example, the distance between reference frame L0 and the current frame is noted as td0 and the distance between reference frame L1 and the current frame is noted as td1. If td0 is equal to or larger than td1, then joint_mvd is directly used for reference L0 and the mvd for reference L1 is derived from joint_mvd based on Equation 1 below.

$$\text{derived\_mvd} = \frac{td1}{td0} * \text{joint\_mvd} \qquad \text{Equation 1}$$

Derived MVD from Joint MVD for $td0 > td1$

If td1 equal to or larger than td0, then joint_mvd is directly used for reference L1 and the mvd for reference L0 is derived from joint_mvd based on Equation 2 below.

$$\text{derived\_mvd} = \frac{td0}{td1} * \text{joint\_mvd} \qquad \text{Equation 2}$$

Derived MVD from Joint MVD for $td0 < td1$

An inter coded mode, AMVDMV, may be added to the single reference case. When AMVDMV mode is selected, it indicates that adaptive MVD resolution (AMVD) is applied to the signal MVD. A flag, for example, amvd_flag may be added under JOINT_NEWMV mode to indicate whether AMVD is applied to joint MVD coding mode or not. When adaptive MVD resolution is applied to joint MVD coding mode, named as joint AMVD coding, MVD for two reference frames are jointly signaled and the precision of MVD is implicitly determined by MVD magnitudes. MVD for two (or more than two) reference frames are jointly signaled, and MVD coding is applied.

In AMVR, initially proposed in CWG-C012, a total of seven MV precisions (8, 4, 2, 1, ½, ¼, ⅛) are supported. For each prediction block, AVM encoder searches all the supported precision values and signals the best precision to the decoder. To reduce the encoder run-time, two precision sets are supported. Each precision set contains 4-predefined precisions. The precision set is adaptively selected at the frame level based on the value of maximum precision of the frame. Similar to AV1, the maximum precision is signaled in the frame header. Table 5 summarizes the supported precision values based on the frame level maximum precision.

TABLE 5

MV Precision per Frame Level Precision

| Frame level maximum precision | Supported MV precisions |
|---|---|
| ⅛ | ⅛, ½, 1, 4 |
| ¼ | ¼, 1, 4, 8 |

In AOM video model (AVM), similar to AV1, there is a frame level flag to indicate if the MVs of the frame contain sub-pel precisions or not. The AMVR is enabled only if the value of cur_frame_force_integer_mv flag is 0. In the AMVR, if precision of the block is lower than the maximum precision, motion model and interpolation filters are not signaled. If the precision of a block is lower than the maximum precision, motion mode is inferred to translation motion and an interpolation filter is inferred to a REGULAR interpolation filter. Similarly, if the precision of the block is either 4-pel or 8-pel, inter-intra mode is not signaled and inferred to be 0.

Motion compensation typically assumes a translational motion model between the reference and target block. However, warped motion utilizes an affine model. The affine motion model may be represented by Equation 3 below.

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix} \qquad \text{Equation 3}$$

Affine Motion Model where [x, y] are coordinates of the original pixel and [x', y'] are the warped coordinates of the reference block. According to Equation 3, up to six parameters are needed to specify the warped motion: $a_3$ and $b_3$ specify a translational MV; $a_1$ and $b_2$ specify the scaling along the MV; and $a_2$ and $b_1$ specify the rotation.

In global warped motion compensation, global motion information is signaled for each inter reference frame, which includes a global motion type and several motion parameters. The global motion types and numbers of associated parameters are listed in Table 6.

TABLE 9

Global Motion Types with Associated Number of Parameters

| Global motion type | Number of parameters |
|---|---|
| Identity (zero motion) | 0 |
| Translational | 2 |
| Rotational | 4 |
| Zoom | 4 |
| General affine | 6 |

After signaling the reference frame index, if global motion is selected, the global motion type and the parameters associated with the given reference frame are used for the current coding block.

In local warped motion compensation, local warped motion is allowed for an inter coding block when the following conditions are met. First, the current block must use a single reference prediction. The width or height of the coding block must be greater than or equal to eight. Finally, at least one of the adjacent neighboring blocks must use the same reference frame as the current block.

If local warped motion is used for the current block, the affine model parameters are estimated by mean-squared minimization of the difference between the reference and modeled projections based on the MVs of the current block and its adjacent neighboring blocks. To estimate the parameters of local warped motion, if the neighboring block uses the same reference frame as the current block, a projection sample pair of the center sample in the neighboring block and its corresponding sample in the reference frame are obtained. Subsequently, three extra samples are created by shifting the center position by a quarter sample in one or both dimensions. These extra samples may also be considered as projection sample pairs to ensure the stability of a model parameter estimation process.

The MVs of neighboring blocks, which are used to derive the motion parameters, are referred to as motion samples. The motion samples are selected from neighboring blocks that use the same reference frame as the current block. Note that the warped motion prediction mode is only enabled for blocks that use a single reference frame.

Figure 5A:
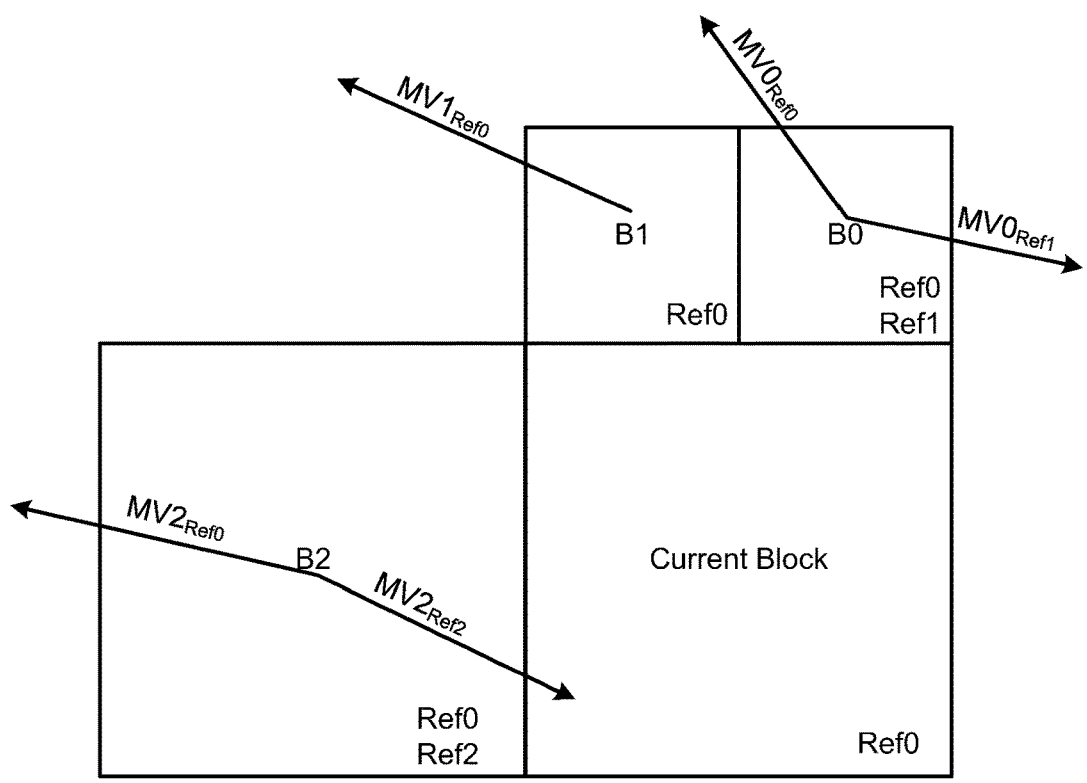
FIG. 5A illustrates example motions samples used for deriving model parameters of a block using local warped motion predictions in accordance with some embodiments.

FIG. 5A illustrates example motions samples used for deriving model parameters of a block using local warped motion predictions in accordance with some embodiments. As shown in FIG. 5A, the MVs of neighboring blocks B0, B1, and B2 are referred as MV0, MV1, and MV2, respectively. The current block is predicted using uni-prediction with reference frame Ref0. For example, the neighboring block B0 is predicted using compound prediction with reference frames Ref0 and Ref1; the neighboring block B1 is predicted using uni-prediction with reference frame Ref0; and the neighboring block B2 is predicted using compound prediction with reference frames Ref0 and Ref2. The motion vector $MV0_{Ref0}$ of B0, $MV1_{Ref0}$ of B1 and $MV2_{Ref0}$ of B2 may be used as the motion samples for deriving the affine motion parameters of the current block.

In addition to translational motion, AVM also supports warped motion compensation. Two types of warped motion models are supported: a global warp model and a local warp model. For example, the global warp model is associated with each reference frame, where each of the four non-translational parameters has 12-bit precision and the translational motion vector is coded in 15-bit precision. A coding block may choose to use it directly (provided the reference frame index). The global warp model captures the frame level scaling and rotation. As such, the global warp model primarily focuses on rigid motion over the entire frame. The local warp model at coding block level is also supported. In a local warp mode, also known as WARPED_CAUSAL, the warp parameters of the current block are derived by fitting a model to nearby motion vectors using least-squares.

Figure 5B:
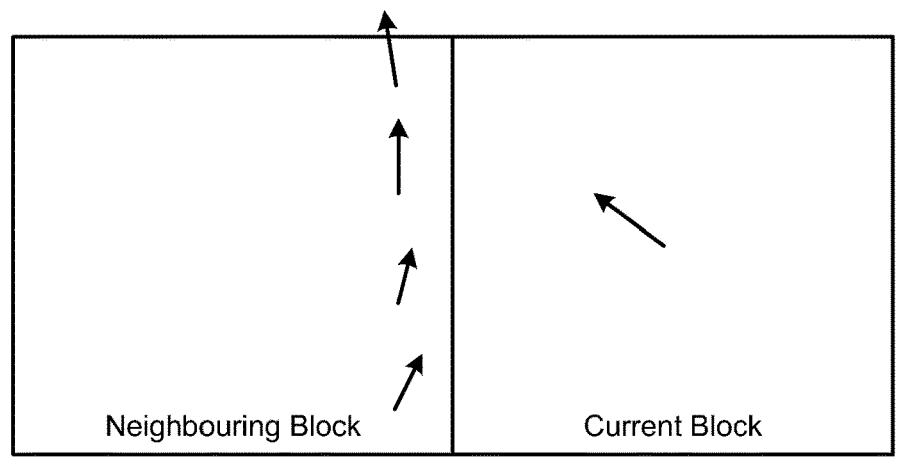
FIG. 5B illustrates motion vectors in blocks using a warp extend mode in accordance with to some embodiments.

In a warped motion mode, WARP_EXTEND, the motion of a neighboring block is smoothly extended into the current block, but with some ability to modify the warp parameters. This allows complex warping motions to be represented, spread across multiple blocks, while minimizing blocking artifacts. To accomplish this, the WARP_EXTEND mode, applied to NEWMV block, builds a new warp model based on two constraints: the per-pixel motion vectors generated by the new warp model should be continuous with the per-pixel motion vectors in a neighboring block, and the pixel at the center of the current block should have a per-pixel motion vector which matches the signalled motion vector for the block as a whole. FIG. 5B illustrates motion vectors in blocks using a warp extend mode in accordance with to some embodiments. As shown in FIG. 5B, for example, if the neighboring block at the left of the current block is warped, then a model which fits the motion vectors illustrated in FIG. 5B is used as the warp model.

The two constraints for building the new warp model imply certain equations involving the warp parameters of the neighboring block and the current block. These equations may then be solved to calculate the warp model for the current block. For example, if (A, . . . , F) represents the neighbor's warp model and (A', . . . , F') represents the new warp model, then the first constraint is as follows, at each point along the common edge:

$$\begin{pmatrix} A' & B' \\ C' & D' \end{pmatrix}\begin{pmatrix} x \\ y \end{pmatrix}+\begin{pmatrix} E' \\ F' \end{pmatrix}=\begin{pmatrix} A & B \\ C & D \end{pmatrix}\begin{pmatrix} x \\ y \end{pmatrix}+\begin{pmatrix} E \\ F \end{pmatrix} \qquad \text{Equation 4}$$

First Constraint for Warp Modeling

Note that the points along the edge have different values of y, but they all have the same value of x. This means that the coefficients of y must be the same on both sides (e.g., B'=B and D'=D). Meanwhile, the x coefficients provide equations relating the other coefficients, defined by Equation 5 below:

$B'=B$ $D'=D$ $A'x+E'=Ax+E$ $C'x+F'=Cx+F$  Equation 5—x Coefficients for Warp Modeling where, in Equation 5, x is the horizontal position of the vertical column of pixels, so is effectively a constant.

The second constraint specifies that the motion vector at the center of the block must equal the one signaled using the NEWMV mechanism. This provides two further equations, resulting in a system of six equations in six variables which has a unique solution. These equations may be solved efficiently, both in software and in hardware. The solution may be solved using basic addition, subtraction, multiplication, and divisions by powers of 2. As such, this mode is significantly less complex than the least-squares based local warp mode.

Note that there may be multiple neighboring blocks to extend from. Therefore, there needs to be a way to choose which block to extend from. This problem is similarly encountered in motion vector prediction. Specifically, there may be several possible motion vectors from nearby blocks, and the one should be selected as the base for NEWMV coding. The solution for this may be extended to handle the needs of WARP_EXTEND. This is done by tracking the source of each motion vector prediction. Then, WARP_EXTEND is only enabled if the selected motion vector prediction is taken from a directly neighboring block. Then, that block is used as the single "neighboring block" in the rest of the algorithm.

Note that sometimes the neighbor's warp model will be very good as-is, without needing any further modification. To make this case cheaper to code, WARP_EXTEND may be used for NEARMV blocks. The neighbor selection is the same as for NEWMV, except that the selection in NEWMV requires the neighbor be warped (not just translated via the translational motion). But if this is true, and WARP_EXTEND is selected, then the neighbor's warp model parameters are copied to the current block.

In some embodiments, a motion mode, WARP_DELTA, may be used. In this mode, the block's warp model is coded as a delta from a predicted warp model, similar to how motion vectors are coded as a delta from a predicted motion vector. The prediction may be sourced from either the global motion model (if any), or a neighboring block.

To avoid having multiple ways to encode the same predicted warp model, restrictions may be applied. For example, if the mode is NEARMV or NEWMV, then the same neighbor selection logic as described for WARP_EXTEND is used. If this results in a neighboring block which is warped, then that neighboring block's model (without applying the rest of the WARP_EXTEND logic) is used as the prediction. Otherwise, the global warp model is used as a base. Other restrictions may be applied. This example is not intended to limit the scope of embodiments. Then, a delta for each of the non-translational parameters may be coded. Finally, the translational part of the model is adjusted so that the per-pixel motion vector at the center of the block matches the block's overall motion vector.

As this tool (WARP_DELTA) involves explicitly coding a delta per warp parameter, it uses more bits to encode than the other warp modes. As such, WARP_DELTA may be disabled for blocks smaller than 16×16. However, the decode logic is extremely simple, and as such may represent more complex motion that the other warp modes cannot.

Figure 5C:
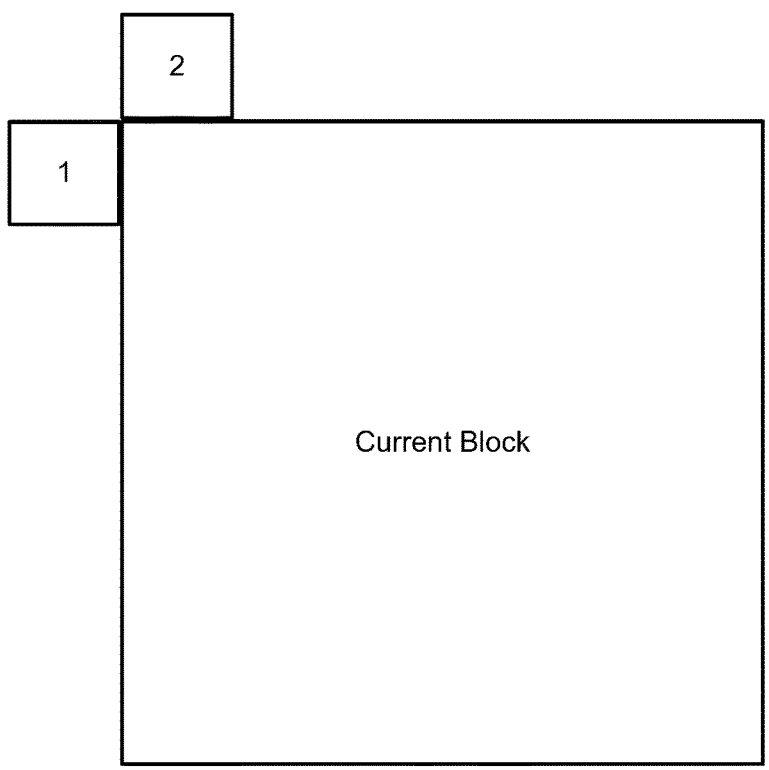
FIG. 5C illustrates a current block with two spatial neighbors in accordance with to some embodiments.
Figure 5D:
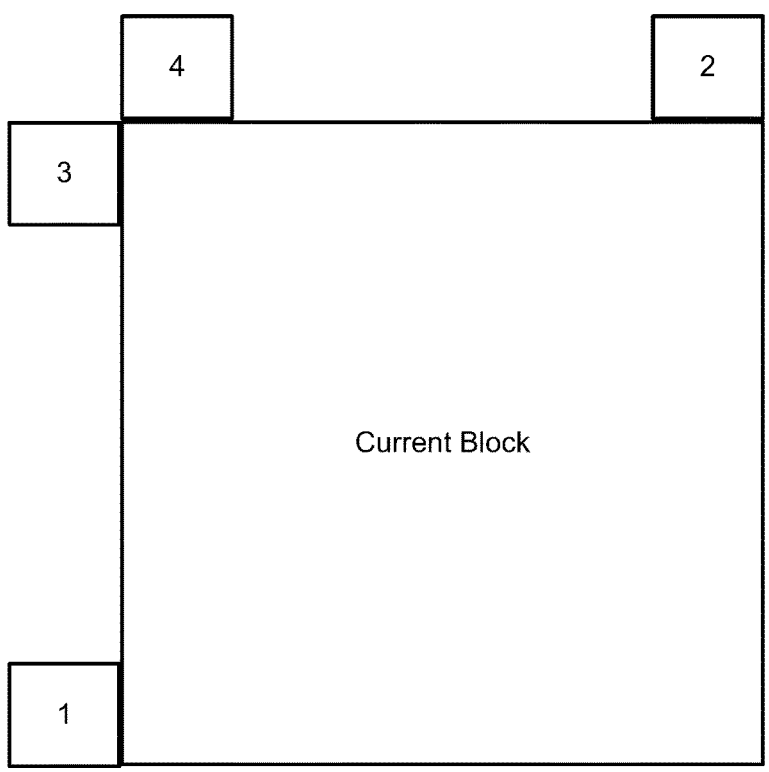
FIG. 5D illustrates a current block with four spatial neighbors in accordance with to some embodiments.

FIG. 5C illustrates a current block with two spatial neighbors in accordance with to some embodiments. FIG. 5D illustrates a current block with four spatial neighbors in accordance with to some embodiments. In some embodiments, the warp extend mode is not always allowed in the syntax level. To check if the warp extend mode is allowed for the current block, the MVP list (dynamic reference list) may need to be constructed. The MVP candidate that is pointed by the MVP index is checked. For example, a candidate may be denoted as S. In this example, the position of S is checked, if S is not from the top-left spatial neighbor (block 2 in FIG. 5C) or the left-top spatial neighbor (block 1 in FIG. 5C), warp extend is not allowed. Otherwise (if S is located at 1 or 2), the mode the current block is checked. If current block is NEWMV, warp extend is allowed, otherwise (e.g., if the current block is NEARMV), the motion mode of S is checked. If S is warp (e.g., regular warp, extended warp, or delta warp), warp extend is allowed, otherwise, warp extend is not allowed.

Similar to the warp extend mode, in some embodiments the warp delta mode is also not always allowed. The allowance of the warp delta mode also depends on the MVP candidate. For example, the MVP candidate (S) that is pointed by the MVP index is checked. If the current block is using NEWMV, warp delta mode is allowed. Otherwise, if the current block is using NEARMV, it is determined whether S is from a spatial neighbor (e.g., it is determined that S is not from TMPV, scaled SMVP, or Ref MV bank, etc.). In this example, if S is spatial and S is warp mode (e.g., regular warp, extended warp, or delta warp), warp delta mode is allowed, otherwise, warp delta mode is not allowed.

In some embodiments, two contexts are needed to code and/or parse the warp extend mode. For example, the first context is derived based on motion mode of the MVP candidate (S) that is pointed by the MVP index. If the current block's mode is NEARMV, the first context equals to 0. If the current block is NEWMV and S is warp mode, the first context equals to 1. If the current block is NEWMV and S is global motion, the first context equals to 2. If the current block is NEWMV and S is translational motion, the first context equals to 3. As an example, the second context depends on the current block boundary size, which is adjacent to S.

The allowance of the warp extend mode and warp delta mode, and the context derivation of the warp extend mode, each require the MVP index pointed MVP candidate. In this way, during the parsing process, the entire MVP list (DRL list) needs to be constructed, which significantly delays the parsing process.

Figure 6:
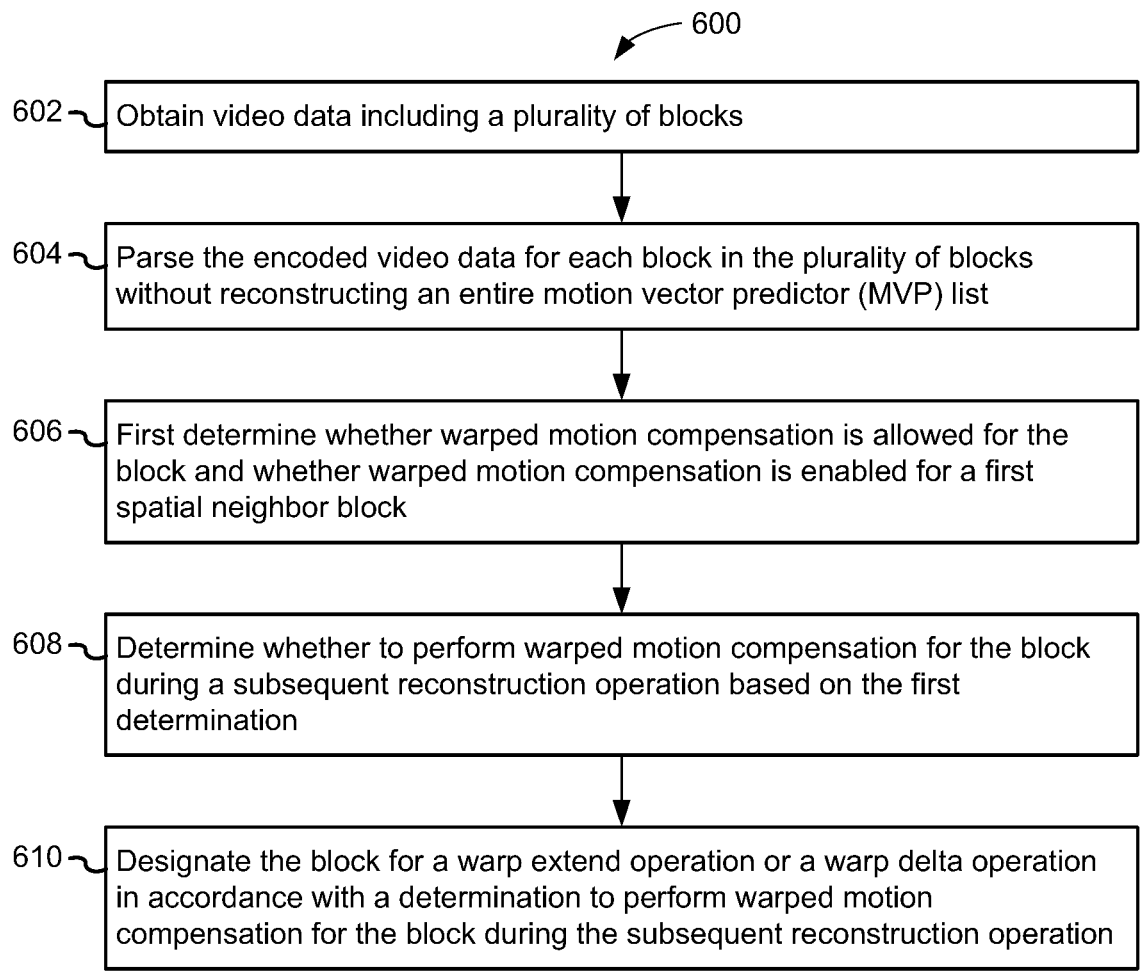
FIG. 6 is a flow diagram illustrating an example method of coding video in accordance with some embodiments.

FIG. 6 is a flow diagram illustrating a method 600 of video decoding in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system. As used herein, the term block may be interpreted as a prediction block, a coding block, or a coding unit (CU).

The system obtains (602) video data including a plurality of blocks. The system parses (604) the encoded video data for each block in the plurality of blocks without reconstructing an entire motion vector predictor (MVP) list. The system first determines (606) whether warped motion compensation is allowed for the block and whether warped motion compensation is enabled for a first spatial neighbor block. The system determines (608) whether to perform warped motion compensation for the block during a subsequent reconstruction operation based on the first determination. The system designates (610) the block for a warp extend operation or a warp delta operation in accordance with a determination to perform warped motion compensation for the block during the subsequent reconstruction operation.

In some embodiments, the warp extend mode or warp delta mode is allowed when the regular warp mode is allowed (e.g., the MVP list is not needed to be constructed during parsing stage).

In some embodiments, whether the warp extend mode or warp delta mode is allowed depends on the availability and mode or motion mode of the spatial neighboring blocks and the mode of the current block. In some embodiments, the number of scanned neighboring block and the position of the neighboring blocks are predefined. In one example, the spatial neighboring blocks are scanned, if one or multiple of the neighboring blocks is available and located in the same tile of the current block, the warp extend or warp delta mode is allowed. In another example, the spatial neighboring blocks are scanned, if one or multiple of the neighboring blocks is available and located in the same tile of the current block, and is inter mode (e.g., not intra), the warp extend or warp delta is allowed. In another example, the spatial neighboring blocks are scanned, if one or multiple of the neighboring blocks is available, and located in the same tile of the current block, and coded by inter mode (e.g., not intra), and is warp mode, the warp extend or warp delta mode is allowed. In another example, the spatial neighboring blocks are scanned, if one or multiple of the neighboring blocks is available, and located in the same tile of the current block, and coded by inter mode (e.g., not intra), the current block mode is further checked. If the current block is NEWMV mode, the warp extend mode or warp delta mode is allowed, otherwise, if the current block is NEARMV mode and one of the spatial neighboring blocks is warp mode, the warp extend mode or warp delta mode of the current block is allowed. In another example, if the current block is NEWMV mode, the warp extend or warp delta mode is allowed, otherwise, the availability of the spatial neighbor is checked, for example as described in the previous examples. In another example, whether warp extend mode is allowed and whether warp delta is allowed are determined by two different processes. In another example, the scanning of neighboring block only involves two top and left neighbors of the current bocks, that is, the spatial neighboring block located at (−1, 0) and (0, −1), as shown in FIG. 5C. In another example, the scanning of neighboring block only involves four top and left neighbors of the current bocks, that is, the spatial neighboring block located at (−1, 0), (0, −1), (height −1, −1), and (−1, width −1), as shown in FIG. 5D. In another example, when scanning the neighboring blocks, the locations of the neighboring blocks may depend on the block shape, and/or aspect ratio, and/or block size.

In some embodiments, one context is used during coding/parsing the warp extend mode. In some embodiments, this context is derived depending on the block size. For example, there are in total 22 possible block sizes, the context is in the range of 0-21.

In some embodiments one context is used during coding/parsing the warp extend mode. In some embodiments, the context depends on the status and/or mode of the spatial neighboring blocks. In some embodiments, the number of the scanned neighboring blocks and the scanning order is predefined. In one example, the context depends on the number of the neighboring blocks which are using warp mode. In another example, the context depends on the number of neighboring blocks which are using global motion. In another example, the context depends on the number of neighboring blocks which are using translational motion. In another example, the context depends on the number of neighboring blocks which have the same reference picture of the current block and are using warp mode, global motion, and/or translational motion. In another example, two or more contexts are used during coding and/or parsing the warp extend mode. In some embodiments, the specific context depends on the status and/or mode of a spatial neighboring block at a predefined location (e.g., block 2 in FIG. 5C). In another example, as shown in FIG. 5C, the first context is derived from the status of block 1. For example, if the current block uses NEARMV mode, the context value equals to 0. If block 1 is not available, not in the same tile, not coded using inter mode, or not have the same reference frame with the current block, the context value is equal to 1. If block 1 is using warp mode, the context value is equal to 2. If block 1 is using global motion, the context value is equal to 3. If block 1 is using translational motion, the context value is equal to 4. In some embodiments, the same rules apply to the second context value that is derived based on the status of block 2.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

As discussed previously, in current systems there is a need to track the MVP list (DRL list) to get candidates in order to determine if warp extend/warp delta modes are allowed for a given block. Certain context derivations also require information from the MVP list. The need to construct the MVP list during the parsing process slows the parsing process and/or requires more compute resources. The embodiments described herein include methods and processes for determining whether to allow warp extend/war delta on a given block without the need to construct the MVP list.

Turning now to some example embodiments.

(A1) In one aspect, some embodiments include a method (e.g., the method 600) of decoding video. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254). The method includes: (i) obtaining encoded video data comprising a plurality of blocks; (ii) parsing the encoded video data for each block in the plurality of blocks without reconstructing an entire motion vector predictor (MVP) list; (iii) first determining whether warped motion compensation is allowed for the block and whether warped motion compensation is enabled for a first spatial neighbor block; (iv) determining whether to perform warped motion compensation for the block during a subsequent reconstruction operation based on the first determination; and (v) designating the block for a warp extend operation or a warp delta operation in accordance with a determination to perform warped motion compensation for the block during the subsequent reconstruction operation.

In some embodiments, the method includes: (i) obtaining encoded video data comprising a plurality of blocks; and (ii) parsing the encoded video data, the parsing comprising, for each block in the plurality of blocks: (a) determining whether to perform warped motion compensation for the block during a subsequent reconstruction operation; and (b) designating the block in accordance with the determination, where the designating includes: (1) designating the block for a warp extend operation or a warp delta operation in accordance with a determination that warped motion compensation is allowed for the block, or (2) designating the block for a warp extend operation or a warp delta operation in accordance with a determination that warped motion compensation is enabled for a first spatial neighbor block.

(A2) In some embodiments of A1, the designating further includes forgoing designating the block for a warp extend operation or a warp delta operation in accordance with a determination that warped motion compensation is not allowed for the block and not allowed for the first spatial neighbor block.

(A3) In some embodiments of A1 or A2, the parsing does not include identifying a motion vector predictor (MVP) candidate or constructing an MVP index. An MVP index is sometimes referred to as a dynamic reference list (DRL) index. An MVP candidate block is the MVP index-pointed candidate block.

(A4) In some embodiments of any of A1-A3, the warp extend operation includes extending motion of a neighboring block.

(A5) In some embodiments of A4, extending motion of the neighboring block includes modifying one or more motion parameters.

(A6) In some embodiments of any of A1-A5, the warp delta operation includes applying a delta to a predicted warp model.

(A7) In some embodiments of A6, the predicted warp model is a global warp model or a warp model of a spatial neighbor block.

(A8) In some embodiments of any of A1-A7, determining whether to perform warped motion compensation for the block includes scanning one or more spatial neighbor blocks, including the first spatial neighbor block.

(A9) In some embodiments of A8, the one or more spatial neighbor blocks are scanned in an order that is based on one or more properties of the block and/or one or more properties of the one or more spatial neighbor blocks. For example, the properties include block size, aspect ratio, and/or block shape.

(A10) In some embodiments of A8 or A9, the one or more spatial neighbor blocks are scanned in a predefined order. For example, first a top-most neighboring block on a left side of the block is analyzed, and second a left-most neighboring block on the top side of the block is analyzed.

As another example, first a bottom-most neighboring block on the left side of the block is analyzed, second a right-most block on a top side of the block is analyzed, third a top-most neighboring block on a left side of the block is analyzed, and fourth a left-most neighboring block on the top side of the block is analyzed.

(A11) In some embodiments of A10, scanning the one or more spatial neighbor blocks includes scanning up to a predefined number of spatial neighbor blocks. In some embodiments, the predefined number of spatial neighbor blocks is a subset of all the spatial neighbor blocks for the block.

(A12) In some embodiments of any of A1-A11, determining whether to perform warped motion compensation for the block includes identifying whether the block is designated for a near motion vector (NEARMV) mode or a new motion vector (NEWMV) mode.

(A13) In some embodiments of A12, the designating further includes designating the block for a warp extend operation or a warp delta operation in accordance with a determination that the block is designated for the NEWMV mode. In some embodiments, the designating further includes designating the block as ineligible for the warp extend operation or the warp delta operation in accordance with a determination that the block is designated for the NEARMV mode.

(A14) In some embodiments of A12 or A13, the designating further includes designating the block for a warp extend operation or a warp delta operation in accordance with a determination that the block is designated for the NEARMV mode, and the determination that warped motion compensation is enabled for a spatial neighbor block. In some embodiments, the designating further includes designating the block as ineligible for the warp extend operation or the warp delta operation in accordance with a determination that the block is designated for the NEARMV mode and a determination that warped motion compensation is not enabled for each spatial neighbor block in a predetermined set of spatial neighbor blocks.

(A15) In some embodiments of any of A1-A14, the designating further includes designating the block for a warp extend operation or a warp delta operation in accordance with a determination that a spatial neighbor block is available, and a determination that the spatial neighbor block is in a same tile as the block. In some embodiments, the designating further includes designating the block as ineligible for the warp extend operation or the warp delta operation in accordance with a determination that each spatial neighbor block in a predetermined set of spatial neighbor blocks is unavailable or not in a same tile as the block.

(A16) In some embodiments of any of A1-A15, the designating further includes designating the block for a warp extend operation or a warp delta operation in accordance with a determination that a spatial neighbor block is available, a determination that the spatial neighbor block is in a same tile as the block, and a determination that the spatial neighbor block is designated as inter-coded. In some embodiments, the designating further includes designating the block as ineligible for the warp extend operation or the warp delta operation in accordance with a determination that each spatial neighbor block in a predetermined set of spatial neighbor blocks is designated as intra-coded.

(A17) In some embodiments of any of A1-A16, the designating further includes designating the block for a warp extend operation or a warp delta operation in accordance with a determination that a spatial neighbor block is available, a determination that the spatial neighbor block is in a same tile as the block, a determination that the spatial neighbor block is designated as inter-coded, and a determination that warped motion compensation is enabled for the spatial neighbor block. In some embodiments, the designating further includes designating the block as ineligible for the warp extend operation or the warp delta operation in accordance with a determination that warped motion compensation is not enabled (disabled) for each spatial neighbor block in a predetermined set of spatial neighbor blocks.

(A18) In some embodiments of any of A1-A17, the designating further includes: (i) designating the block for a warp extend operation or a warp delta operation in accordance with a determination that the block is designated for a new motion vector mode; or (ii) designating the block for a warp extend operation or a warp delta operation in accordance with a determination that the block is designated for a near motion vector mode and a determination that a spatial neighbor block is available. In some embodiments, the designating further includes designating the block as ineligible for the warp extend operation or the warp delta operation in accordance with a determination that the block is designated for a near motion vector mode and a determination that each spatial neighbor block in a predetermined set of spatial neighbor blocks is unavailable or not in a same tile as the block.

(A19) In some embodiments of any of A1-A18, the parsing further includes, for a block in the plurality of blocks, determining a warp extend context for the block.

(A20) In some embodiments of A19, the warp extend context is determined based on a block size of the block.

(A21) In some embodiments of A19 or A20, the warp extend context is determined based on a scan of one or more spatial neighbor blocks. In some embodiments, the scan of the one or more spatial neighbor blocks includes scanning up to a predefined number of spatial neighbor blocks in a predefined order.

(A22) In some embodiments of any of A19-A21, the warp extend context is determined based on a number of spatial neighbor blocks designated for warped motion compensation.

(A23) In some embodiments of any of A19-A22, the warp extend context is determined based on a number of spatial neighbor blocks using global motion (e.g., designated as using a global motion model).

(A24) In some embodiments of any of A19-A23, the warp extend context is determined based on a number of spatial neighbor blocks using translational motion (e.g., designated as using a translational motion model).

(A25) In some embodiments of any of A19-A23, the warp extend context is determined based on a number of spatial neighbor blocks that have a same reference picture as the block and are using one of: a warp mode, global motion, or translational motion.

(A26) In some embodiments of any of A19-A25, the warp extend context is determined based on a status and/or mode of a predefined spatial neighbor block. In some embodiments, the predefined spatial neighbor block is the left-most neighboring block on a top side of the block (e.g., block 2 in FIG. 5C). In some embodiments, the predefined spatial neighbor block is the top-most neighboring block on a left side of the block (e.g., block 1 in FIG. 5C).

(A27) In some embodiments of any of A19-A26, the warp extend context includes a first context determined based on the first spatial neighbor block and a second context determined based on a second spatial neighbor block.

(A28) In some embodiments of any of A19-A27: (i) the warp extend context is assigned a first value in accordance with a determination that the block is designated for a near motion vector mode; (ii) the warp extend context is assigned a second value in accordance with a determination that a predefined spatial neighbor block is unavailable, not in a same tile as the block, not designated as inter-coded, or not having a same reference frame as the block; (iii) the warp extend context is assigned a third value in accordance with a determination that the predefined spatial neighbor block is using global motion; (iv) the warp extend context is assigned a fourth value in accordance with a determination that the predefined spatial neighbor block is using global motion; and (v) the warp extend context is assigned a fifth value in accordance with a determination that the predefined spatial neighbor block is using translational motion.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A28 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A28 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
    obtaining encoded video data comprising a plurality of blocks;
    parsing the encoded video data for each block in the plurality of blocks without reconstructing an entire motion vector predictor (MVP) list;
    first determining whether warped motion compensation is allowed for the block and whether warped motion compensation is enabled for a first spatial neighbor block;
    determining whether to perform warped motion compensation for the block during a subsequent reconstruction operation based on the first determination; and
    designating the block for a warp extend operation or a warp delta operation in accordance with a determination to perform warped motion compensation for the block during the subsequent reconstruction operation.

2. The method of claim 1, wherein the parsing does not include identifying a motion vector predictor candidate or constructing an MVP index.

3. The method of claim 1, wherein determining whether to perform warped motion compensation for the block comprises scanning one or more spatial neighbor blocks, including the first spatial neighbor block.

4. The method of claim 3, wherein the one or more spatial neighbor blocks are scanned in an order that is based on one or more properties of the block and/or one or more properties of the one or more spatial neighbor blocks.

5. The method of claim 3, wherein the one or more spatial neighbor blocks are scanned in a predefined order.

6. The method of claim 5, wherein scanning the one or more spatial neighbor blocks comprises scanning up to a predefined number of spatial neighbor blocks.

7. The method of claim 1, wherein determining whether to perform warped motion compensation for the block comprises identifying whether the block is designated for a near motion vector (NEARMV) mode or a new motion vector (NEWMV) mode.

8. The method of claim 7, wherein the designating further comprises designating the block for a warp extend operation or a warp delta operation in accordance with a determination that the block is designated for the NEWMV mode.

9. The method of claim 7, wherein the designating further comprises designating the block for a warp extend operation or a warp delta operation in accordance with:
    a determination that the block is designated for the NEARMV mode, and
    the determination that warped motion compensation is enabled for a spatial neighbor block.

10. The method of claim 1, wherein the designating further comprises designating the block for a warp extend operation or a warp delta operation in accordance with:

a determination that a spatial neighbor block is available, and a determination that the spatial neighbor block is in a same tile as the block.

11. The method of claim 1, wherein the designating further comprises designating the block for a warp extend operation or a warp delta operation in accordance with:

a determination that a spatial neighbor block is available, a determination that the spatial neighbor block is in a same tile as the block, and a determination that the spatial neighbor block is designated as inter-coded.

12. The method of claim 1, wherein the designating further comprises designating the block for a warp extend operation or a warp delta operation in accordance with:

a determination that a spatial neighbor block is available, a determination that the spatial neighbor block is in a same tile as the block, a determination that the spatial neighbor block is designated as inter-coded, and a determination that warped motion compensation is enabled for the spatial neighbor block.

13. The method of claim 1, wherein the designating further comprises:

designating the block for a warp extend operation or a warp delta operation in accordance with a determination that the block is designated for a new motion vector mode; or designating the block for a warp extend operation or a warp delta operation in accordance with a determination that the block is designated for a near motion vector mode and a determination that a spatial neighbor block is available.

14. The method of claim 1, wherein the parsing further comprises, for a block in the plurality of blocks, determining a warp extend context for the block.

15. A computing system, comprising:
control circuitry;
memory; and
one or more sets of instructions stored in the memory and configured for execution by the control circuitry, the one or more sets of instructions comprising instructions for:

obtaining encoded video data comprising a plurality of blocks;

parsing the encoded video data for each block in the plurality of blocks without reconstructing an entire motion vector predictor (MVP) list;

first determining whether warped motion compensation is allowed for the block and whether warped motion compensation is enabled for a first spatial neighbor block;

determining whether to perform warped motion compensation for the block during a subsequent reconstruction operation based on the first determination; and designating the block for a warp extend operation or a warp delta operation in accordance with a determination to perform warped motion compensation for the block during the subsequent reconstruction operation.

16. The computing system of claim 15, wherein the warp extend operation comprises extending motion of a neighboring block.

17. The computing system of claim 15, wherein determining whether to perform warped motion compensation for the block comprises scanning one or more spatial neighbor blocks, including the first spatial neighbor block.

18. A non-transitory computer-readable storage medium storing one or more sets of instructions configured for execution by a computing device having control circuitry and memory, the one or more sets of instructions comprising instructions for:

obtaining encoded video data comprising a plurality of blocks;

parsing the encoded video data for each block in the plurality of blocks without reconstructing an entire motion vector predictor (MVP) list;

first determining whether warped motion compensation is allowed for the block and whether warped motion compensation is enabled for a first spatial neighbor block;

determining whether to perform warped motion compensation for the block during a subsequent reconstruction operation based on the first determination; and designating the block for a warp extend operation or a warp delta operation in accordance with a determination to perform warped motion compensation for the block during the subsequent reconstruction operation.

19. The non-transitory computer-readable storage medium of claim 18, wherein the warp extend operation comprises extending motion of a neighboring block.

20. The non-transitory computer-readable storage medium of claim 18, wherein determining whether to perform warped motion compensation for the block comprises scanning one or more spatial neighbor blocks, including the first spatial neighbor block.

* * * * *